Patented May 9, 1939

2,157,509

UNITED STATES PATENT OFFICE 2,157,509

PROCESS FOR THE REMOVAL OF FLUORIDES FROM WATER

Oliver M. Urbain and William R. Stemen, Columbus, Ohio, assignors to Charles H. Lewis, Harpster, Ohio No Drawing. Application November 27, 1935, Serial No. 51,968. Renewed October 18, 1938

13 Claims. (Cl. 210—23)

The present invention relates to the provision of a practical and efficient process for the removal of fluorides from water.

In many parts of the country the surface waters contain fluorides in appreciable quantities. In recent years research workers have conducted extensive research respecting the hygenic effects of small quantities of fluorides in drinking water. The presence of fluorides in drinking water is frequently traceable to the passage of the water over out croppings of calcium fluoride deposits. The research work thus far done has definitely established that fluorides have a deleterious effect upon the teeth. This is true even where the content of fluorides in the water is as low as one part per million. It will be appreciated, therefore, that it is advantageous to remove these deleterious substances from the water.

In accordance with the present invention a process is provided by which a complete removal of fluorides from water may be effected regardless of the concentration of the fluorides up to the saturation point of calcium fluoride which is, of course, a condition impossible in any natural water supply.

In accordance with the process of the present invention the removal of the fluorides is effected through the medium of anion exchange or adsorption. To carry out the process it is necessary to employ a suitable and efficient exchange medium or adsorbent material and to the end that the invention may be clearly comprehended, we will here detail the manner of preparation of and the characteristics possessed by the exchange or adsorbent materials suitable for use in carrying out our process for the removal of fluorides from water.

The materials prepared for effecting the exchange or adsorption of the fluorides are made up of the metal chloride silicates. They conform to the general formulae:

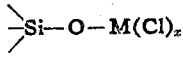

in which M designates a metal and $x$ designates the valence of the metal minus one. The materials for effecting the fluoride exchange must have a solubility in water of less than 0.3 gram per liter. The general formulae shows only the active part of the molecule, the three free valencies to the left of the Si merely indicate the manner of attachment of the inactive part of the molecule.

In the preparation of these materials the general reaction for their preparation may be expressed as follows:

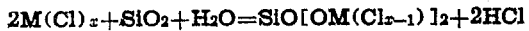

Specific examples of reactions occurring in the preparation of the exchange materials are as follows:

*Example No. 1*

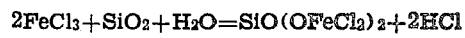

*Example No. 2*

In the first example we employ anhydrous ferric chloride and silicic acid, and in the second example, we employ barium chloride and silicic acid. The exchange or adsorbent materials can be prepared in either of two ways:

First, by fusing the appropriate metal chloride with silicic acid under definitely controlled conditions, and, second by treating a solution of sodium silicate with the appropriate metal chloride in solution. If the latter procedure is followed it is necessary to substantially oxidize the metal of the material to a state of higher valence and, thereby, introduce one or more chlorine atoms into the molecule. When the exchange materials are used for the removal of fluoride ions from water the chlorine in these compounds is replaced by the anion removed in accordance with the general formulae:

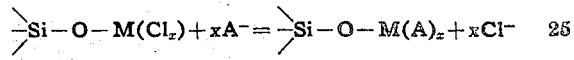

wherein M indicates a metal, $x$ indicates the valence of the metal minus one and $A^-$ indicates a negative fluoride ion.

In the employment of these materials there possibly occurs some superficial adsorption of the fluoride ions but for the most part we find that the fluorides are removed from the water by an exchange mechanism whereby the fluoride ions are exchanged for chloride ions which are loosely held by the exchange material through chemical or physical processes or both. This procedure may be compared to cation exchange as effected through the medium of zeolites, except in the removal of fluorides there is effected an exchange of anions.

In the preparation of these exchange materials, we have in general, made the materials by fusing a mixture of a halide with silicic acid or its anhydride.

The metal of the metal halide must have a valence of two or more. In some cases the presence of an added mono-valent metal in the above reaction mixture is found desirable. When such a mono-valent metal halide is employed, its halide must be the same as the halide of the metal having a valence of two or more. We have also found that in some cases the product is improved by heating in an atmosphere of an halogen.

For purposes of illustration we now describe the preparation of two materials suitable for effecting fluoride exchange. It is to be understood that these examples are illustrative and not to be construed as a limitation of the invention.

First, five (5) parts of silicic acid and twenty-five (25) parts of hydrated barium chloride are intimately mixed and ground together. The mixture is fused at a temperature between 500° C. and 1500° C. for a period of from one to four hours. After cooling, the mass is washed free of soluble salts and is then ready for use.

Second, four (4) parts of silicic acid and eight (8) parts of anhydrous ferric chloride and eight (8) parts of sodium chloride are ground together and fused at a temperature between 500° C. and 1500° C. for one-half hour to three hours. The fused mass is then heated in an atmosphere of chlorine at approximately 1200° C. for one hour. The mass, after cooling, is water washed and is then ready for use.

It will be observed that we have indicated that the fluoride exchange materials contain metasilicates. It is, of course, probable that these materials contain, as well, some chlorine orthosilicates and chloride polysilicates, or a mixture of these compounds. In the preparation of the exchange materials all of the reagents employed must be in excess over the silicic acid.

Still a further illustration of the preparation of an exchange material is as follows:

Five (5) parts of silicic acid was fused with twenty-five (25) parts of crystallized $BaCl_2$ at 900° C. for two hours. The mass then cooled and washed to free the same of soluble chlorides.

In carrying out our improved process for the removal of fluorides from water, two modes of operation may be employed.

First, we may advantageously add the exchange material in powdered form to the water, effect agitation for a period of approximately five minutes and then effect coagulation and removal from the solution. Any suitable recognized coagulant may be employed such as ferrous sulphate or aluminum sulphate.

Second, instead of incorporating the exchange material into the fluoride bearing solution in powdered form, we may pass the fluoride bearing solution through a filter charged with the exchanged material. After the exchange material has been exhausted it may be, because of the economic manner in which it can be produced, wholly discarded and the filter recharged with active exchange material.

We have found that by carrying out our improved process in accordance with either mode of operation, we are able to effect a hundred percent removal of the fluorides contained in the water.

Having thus described our invention what we claim is:

1. A process for the removal of fluorides from water comprising passing a fluoride bearing solution through a filter charged with an exchange material having the general formulae:

in which M designates a metal having a valence of two or more and $x$ designates the valence of the metal minus one.

2. A process for the removal of fluorides from water comprising subjecting a fluoride bearing solution to the action of an exchange material prepared in accordance with the following reaction:

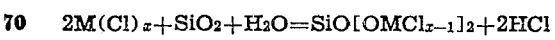

in which M designates a metal having a valence of two or more and $x$ designates the valance of the metal minus one.

3. A process for the removal of fluorides from water comprising subjecting a fluoride bearing solution to the action of an exchange material prepared in accordance with the following reaction:

4. A process for the removal of fluorides from water comprising subjecting a fluoride bearing solution to the action of an exchange material prepared in accordance with the following reaction:

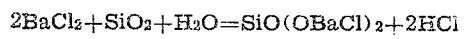

5. A process for the removal of fluorides from water comprising subjecting a fluoride bearing solution to the action of an exchange material prepared in accordance with any one of the following reactions: Reaction 1:

Reaction 2:

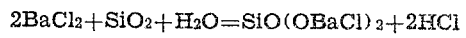

6. A process for removal of fluoride ions from potable water which comprises contacting the liquid containing the fluoride ions with a compound having anion exchanging properties.

7. A process for removal of fluoride ions from potable water which comprises contacting the liquid containing the fluoride ions with a polyvalent metal chloride silicate.

8. A process for removal of fluoride ions from potable water which comprises contacting the liquid containing the fluoride ions with a polyvalent metal chloride silicate, the solubility of which is less than 0.3 gram per liter.

9. A process for removal of fluoride ions from potable water which comprises the steps of adding a polyvalent metal chloride silicate to the water, agitating for a short period, and effecting coagulation and removal from solution with a recognized coagulant.

10. A process for removal of fluoride ions from potable waters which comprises the steps of passing the fluoride bearing solution through a filter charged with a polyvalent metal chloride silicate, agitating for a short period, and effecting coagulation and removal from solution with a recognized coagulant.

11. A process for removal of fluorides from water comprising subjecting a fluoride bearing solution to the action of an exchange material prepared by fusing a mixture of a polyvalent metal halide with silicic acid.

12. A process for the removal of fluorides from water comprising subjecting a fluoride bearing solution to the action of an exchange material prepared by fusing a mixture of a polyvalent metal halide with silicic acid in the presence of a monovalent metal halide, the anion of which is the same as that of the polyvalent metal halide.

13. A process for the removal of fluorides from water comprising subjecting a fluoride bearing solution to the action of an exchange material prepared by fusing a mixture of a polyvalent metal halide with silicic acid in the presence of a monovalent metal halide, the anion of which is the same as that of the polyvalent metal halide, and heating in an atmosphere of a halogen.

OLIVER M. URBAIN.
WILLIAM R. STEMEN.